US009917969B2

United States Patent
Urakawa (10) Patent No.: US 9,917,969 B2
(45) Date of Patent: Mar. 13, 2018

(54) IMAGE FORMING APPARATUS CONFIGURED TO NOTIFY THAT SETTING CHANGE OF INFORMATION PROCESSING TERMINAL IS NEEDED

(71) Applicant: BROTHER KOGYO KABUSHIKI KAISHA, Nagoya-shi, Aichi-ken (JP)

(72) Inventor: Yutaka Urakawa, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 15/276,844

(22) Filed: Sep. 27, 2016

(65) Prior Publication Data

US 2017/0094091 A1    Mar. 30, 2017

(30) Foreign Application Priority Data

Sep. 30, 2015  (JP) ................................. 2015-192947

(51) Int. Cl.
*G06F 3/12* (2006.01)
*H04N 1/00* (2006.01)
*H04L 29/08* (2006.01)
*H04L 12/58* (2006.01)

(52) U.S. Cl.
CPC ......... *H04N 1/00973* (2013.01); *H04L 51/24* (2013.01); *H04L 67/104* (2013.01); *H04N 1/00204* (2013.01); *H04N 2201/0055* (2013.01); *H04N 2201/0094* (2013.01)

(58) Field of Classification Search
None
See application file for complete search history.

(56) References Cited

U.S. PATENT DOCUMENTS

2007/0208863 A1* 9/2007 Otsuka ............... H04N 1/00222
                                                    709/227
2013/0083340 A1* 4/2013 Asai ..................... G06F 3/1204
                                                    358/1.13

FOREIGN PATENT DOCUMENTS

| JP | 2006-085255 A | 3/2006 |
| JP | 2010-134827 A | 6/2010 |
| JP | 2013-077142 A | 4/2013 |

* cited by examiner

*Primary Examiner* — Henok A Shiferaw
(74) *Attorney, Agent, or Firm* — Scully Scott Murphy and Presser (57) ABSTRACT

A memory is configured to store apparatus information that is information needed for an information processing terminal to transmit formation instructing information that instructs an image forming operation. The memory further stores instructions, the instructions, when executed by a controller, causing an image forming apparatus to execute: a first receiving process of receiving transmission requesting information from the information processing terminal through a first communicator; a first transmitting process of, in response to receiving the transmission requesting information, transmitting the apparatus information to the information processing terminal through the first communicator; a detecting process of detecting that a second communicator is connected to a communication network; and a notifying process of, in response to detecting that the second communicator is connected to the communication network, controlling a notifier to notify that a setting change of the information processing terminal is needed to transmit formation instructing information through the communication network.

19 Claims, 7 Drawing Sheets

| TERMINAL ADDRESS INFORMATION | NOTIFICATION FLAG |
|---|---|
| 192.168.0.1 | OFF |
| 192.168.0.2 | OFF |
| ⋮ | ⋮ |

FIG. 3B

| PRINTER NAME | DRIVER NAME | APPARATUS ADDRESS INFORMATION | PORT NAME |
|---|---|---|---|
| MFP-A | DRIVER A | — | USB001 |
| ⋮ | ⋮ | ⋮ | ⋮ |

FIG. 3C

| PRINTER NAME | DRIVER NAME | APPARATUS ADDRESS INFORMATION | PORT NAME |
|---|---|---|---|
| MFP-A | DRIVER A | 192.168.0.200 | 192.168.0.200 |
| ⋮ | ⋮ | ⋮ | ⋮ |

IMAGE FORMING APPARATUS CONFIGURED TO NOTIFY THAT SETTING CHANGE OF INFORMATION PROCESSING TERMINAL IS NEEDED

CROSS REFERENCE TO RELATED APPLICATIONS

This application claims priority from Japanese Patent Application No. 2015-192947 filed Sep. 30, 2015. The entire content of the priority application is incorporated herein by reference.

TECHNICAL FIELD

This disclosure relates to an image forming apparatus configured to form an image in accordance with instructions from an information processing terminal. This disclosure also relates to a storage medium storing a monitor program, and an image forming system.

BACKGROUND

Conventionally, an image forming apparatus that forms an image in accordance with instructions from an information processing terminal is known. More specifically, an information processing terminal in which a device driver is installed transmits formation instructing information to the image forming apparatus. The image forming apparatus then forms an image in accordance with the formation instructing information received from the information processing terminal. For example, it is disclosed that the above-described processes are executed between an information processing terminal and an image forming apparatus connected to each other by LAN or USB.

SUMMARY

According to one aspect, this specification discloses an image forming apparatus. The image forming apparatus includes an image forming device, a first communicator, a second communicator, a notifier, a controller, and a memory. The image forming device is configured to perform an image forming operation. The first communicator is configured to communicate with an information processing terminal connected by peer-to-peer through a communication line. The second communicator is configured to communicate with the information processing terminal by specifying terminal address information. The terminal address information is address information that identifies the information processing terminal on a communication network. The memory is configured to store apparatus information. The apparatus information is information needed for the information processing terminal to transmit formation instructing information that instructs the image forming operation. The memory further stores instructions, the instructions, when executed by the controller, causing the image forming apparatus to execute: a first receiving process of receiving transmission requesting information from the information processing terminal through the first communicator; a first transmitting process of, in response to receiving the transmission requesting information in the first receiving process, transmitting the apparatus information stored in the memory to the information processing terminal through the first communicator; a detecting process of detecting that the second communicator is connected to the communication network; and a notifying process of, in response to detecting in the detecting process that the second communicator is connected to the communication network, controlling the notifier to notify that a setting change of the information processing terminal is needed to transmit the formation instructing information through the communication network.

According to another aspect, this specification also discloses a non-transitory computer-readable storage medium storing a monitor program executable on an information processing terminal including a third communicator configured to communicate with an image forming apparatus connected by peer-to-peer through a communication line, a fourth communicator configured to communicate with the image forming apparatus by specifying apparatus address information, a notifier, and a memory configured to store an output program. The apparatus address information is address information identifying the image forming apparatus on a communication network. The output program is configured to control the information processing terminal to transmit formation instructing information that instructs an image forming operation, to the image forming apparatus, through one of the third communicator and the fourth communicator. The monitor program includes: a reception preparing process of, in response to that the output program is set to transmit the formation instructing information through the third communicator, preparing such a state that information is received from the image forming apparatus through the fourth communicator; a receiving process of receiving setting notification information from the image forming apparatus through the fourth communicator, the setting notification information including the apparatus address information, the setting notification information being information indicating that a setting change of the output program is needed to transmit the formation instructing information through the communication network; and a notifying process of controlling the notifier to notify that the setting change of the output program is needed, in accordance with the setting notification information received in the receiving process.

According to still another aspect, this specification also discloses an image forming system. The image forming system includes an image forming apparatus and an information processing terminal. The image forming apparatus includes an image forming device, a first communicator, a second communicator, a notifier, a controller, and a memory. The image forming device is configured to perform an image forming operation. The first communicator is configured to communicate with the information processing terminal connected by peer-to-peer through a communication line. The second communicator is configured to communicate with the information processing terminal by specifying terminal address information. The terminal address information is address information that identifies the information processing terminal on a communication network. The memory is configured to store apparatus information. The apparatus information is information needed for the information processing terminal to transmit formation instructing information that instructs the image forming operation. The memory further stores instructions, the instructions, when executed by the controller, causing the image forming apparatus to execute: a first receiving process of receiving transmission requesting information from the information processing terminal through the first communicator; a first transmitting process of, in response to receiving the transmission requesting information in the first receiving process, transmitting the apparatus information stored in the memory to the information processing terminal through the first communicator; a detecting process of detecting that the second communicator is connected to the communication network; and a notifying process of, in response to detecting in the detecting process that the second communicator is connected to the communication network, controlling the notifier to notify that a setting change of the information processing terminal is needed to transmit the formation instructing information through the communication network. The information processing terminal includes a third communicator, a fourth communicator, a terminal controller, and a terminal memory. The third communicator is configured to communicate with the image forming apparatus connected by peer-to-peer through the communication line. The fourth communicator is configured to communicate with the image forming apparatus by specifying apparatus address information. The apparatus address information is the address information identifying the image forming apparatus on the communication network. The terminal memory is configured to store an output program. The output program is configured to transmit the formation instructing information to the image forming apparatus through one of the third communicator and the fourth communicator. The terminal memory further stores instructions, the instructions, when executed by the terminal controller, causing the information processing terminal to execute: a second transmitting process of transmitting the transmission requesting information to the image forming apparatus through the third communicator; a second receiving process of receiving the apparatus information from the image forming apparatus through the third communicator; and a setting process of setting the output program such that the formation instructing information is transmitted through the fourth communicator by using the apparatus information received in the second receiving process.

BRIEF DESCRIPTION OF THE DRAWINGS

Embodiments in accordance with this disclosure will be described in detail with reference to the following figures wherein:

FIGS. 3A to 3C are data examples stored in data storage areas 32B, 62B, wherein

FIGS. 7A and 7B are display examples of displays 23, 53, wherein

DETAILED DESCRIPTION

Settings of a device driver are different between a case where formation instructing information is transmitted through LAN and a case where the formation instructing information is communicated through USB. More specifically, the device driver transmits the formation instructing information to the image forming apparatus through a so-called printer port that differs depending on the communication interface.

Hence, even if an image forming apparatus connected to an information processing terminal through USB is connected to LAN, a printer port for LAN has to be created at the information processing terminal. Otherwise, formation instructing information cannot be transmitted and received through LAN. However, it may take time for a user who does not know these details to identify a cause that a system having been functioning normally through USB does not function through LAN.

In view of the foregoing, an example of the object of this disclosure is to provide an image forming apparatus configured to notify at appropriate timing that setting change of an information processing terminal is needed for transmitting formation instructing information.

Some aspects of this disclosure will be described while referring to the accompanying drawings.

Figure 1:
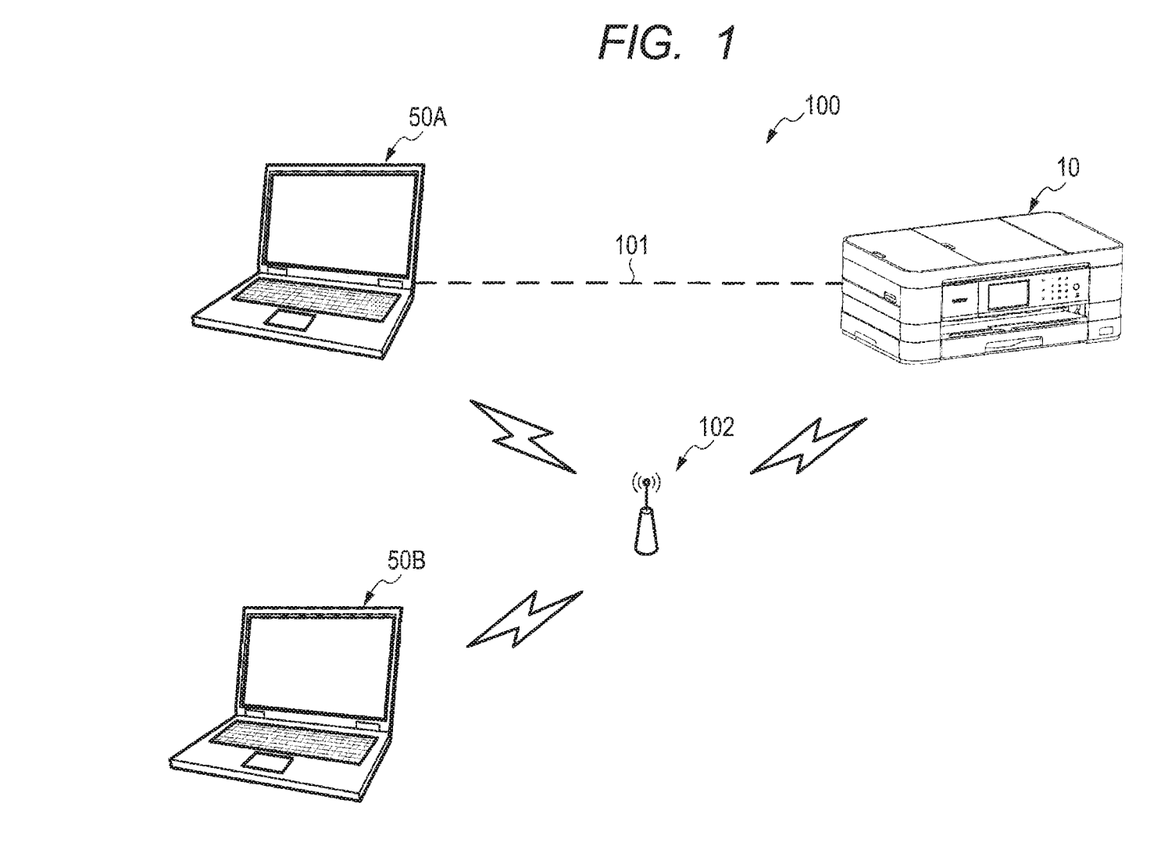
FIG. 1 is a schematic diagram showing a monitor system 100 according to a first embodiment.

A monitor system 100 shown in FIG. 1 includes an MFP 10 and information processing terminals 50A, 50B (hereinafter, these terminals may be collectively referred to as "information processing terminal 50").

The MFP 10 and the information processing terminal 50A are connected to each other through a USB cable 101. That is, one end of the USB cable 101 is connected to a USB interface 25 of the MFP 10, and the other end of the USB cable 101 is connected to a USB interface 55 of the information processing terminal 50A, so that the MFP 10 and the information processing terminal 50A are connected to each other. The USB cable 101 is an example of a communication line that connects the MFP 10 and the information processing terminal 50A in peer-to-peer manner. A specific example of the communication line is not limited to the USB cable 101. Further, the MFP 10 and information processing terminal 50A may be a star type, a tree type, or the like in the physical topology, as long as the MFP 10 and information processing terminal 50A are connected by peer-to-peer logically. That is, the MFP 10 and the information processing terminal 50A may be connected through a USB hub or the like.

The MFP 10 and the information processing terminals 50A, 50B are configured to communicate with each other through a communication network. A specific example of the communication network is not limited to this, but, for example, may be a wired LAN (Local Area Network), a wireless LAN, or a combination thereof. The MFP 10 and the information processing terminals 50A, 50B of the first embodiment belong to the same wireless LAN. That is, the MFP 10 and the information processing terminals 50A, 50B perform wireless communication with one another by way of an access point 102. Here, the communication network is not limited to a star-type topology having the access point 102 at the center, but may be a peer-to-peer topology in which the MFP 10 and the information processing terminals 50A, 50B are connected directly.

The MFP 10 specifies address information of the information processing terminals 50A, 50B (hereinafter referred to as "terminal address information"), thereby performing communication with the information processing terminals 50A, 50B through the communication network. Similarly, the information processing terminals 50A, 50B specify address information of the MFP 10 (hereinafter referred to as "apparatus address information"), thereby performing communication with the MFP 10 through the communication network. A specific example of the address information is not limited to this, but, for example, may be an IP (Internet Protocol) address, a subnet mask, a MAC (Media Access Control) address, or a combination thereof.

[MFP 10]

Figure 2A:
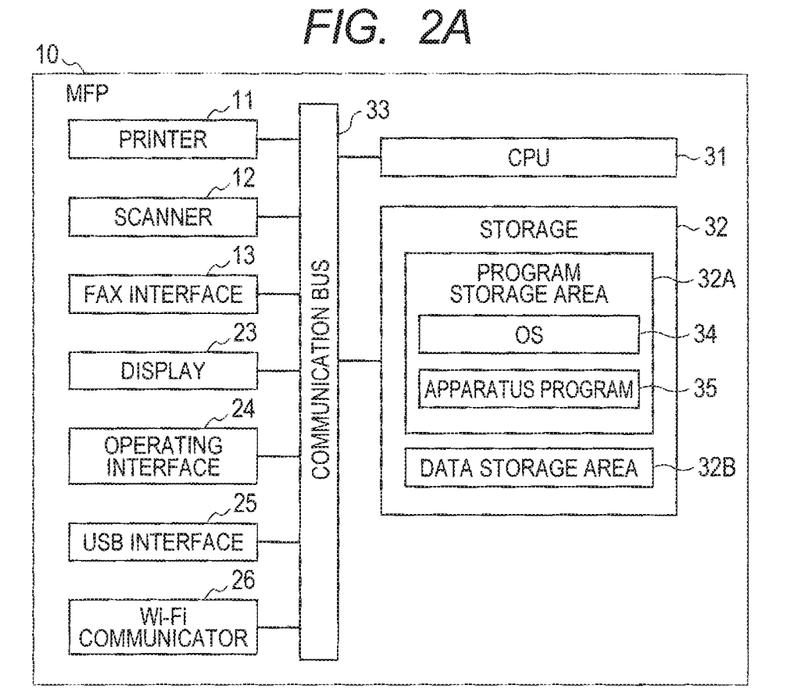
FIG. 2A is a functional block diagram of a multifunction peripheral (MFP) 10.

As shown in FIG. 2A, the MFP 10 mainly includes a printer 11, a scanner 12, a FAX interface 13, a display 23, an operating interface 24, a USB interface 25, a Wi-Fi communicator 26, a CPU 31, a storage 32, and a communication bus 33. The elements constituting the MFP 10 are connected to one another through the communication bus 33. The MFP 10 is an example of an image forming apparatus. The printer 11, the scanner 12, and the FAX interface 13 are examples of an image forming device. The USB interface 25 is an example of a first communicator. The Wi-Fi communicator 26 is an example of a second communicator.

[Printer 11, Scanner 12, FAX Interface 13]

The printer 11 performs a print operation of recording an image indicated by image data on recording paper. The recording paper is an example of a sheet or a recording medium. As the recording method of the printer 11, a known method such as an inkjet method and an electro-photographic method may be adopted. The scanner 12 performs a scan operation of reading an image recorded on an original document and forming image data. The printer 11 is an example of a recorder. The scanner 12 is an example of a reader. The FAX interface 13 performs a FAX transmission/reception operation of transmitting/receiving image data with a method compatible with a FAX protocol. The MFP 10 may further perform a copy operation of reading an image recorded on recording paper and recording the image on another recording paper, and so on. The print operation, the scan operation, the FAX transmission/reception operation, and the copy operation are examples of an image forming operation.

[Display 23]

The display 23 includes a display screen that displays various kinds of information. As the display 23, a liquid crystal display, an organic EL display (Organic Electro-Luminescence Display), and so on may be adopted. The display 23 is an example of a notifier (output interface). Here, a specific example of the notifier is not limited to the display 23. The notifier may be a speaker that outputs a guidance voice or a beep sound, or may be an LED lamp that lights on or blinks.

[Operating Interface 24]

The operating interface 24 receives a user operation of selecting an object that is displayed on the display screen of the display 23. Specifically, the operating interface 24 has buttons, and outputs various operation signals associated with pressed buttons to the CPU 31. The operating interface 24 may further have a film-like touch sensor that is layered on the display screen of the display 23. That is, the display 23 may be a touch panel display.

Here, the term "object" denotes an image that can be selected by user's operation on the operating interface 24. As one example, objects may be character strings displayed on the display 23, and one of the objects may be highlighted by pressing a cursor key of the operating interface 24, and the highlighted object may be selected by pressing the enter button of the operating interface 24. As another example, objects in a case where the operating interface 24 is a touch panel may be icons, radio buttons, check boxes, pull-down menus, links, and so on, displayed on the display 23, and the object displayed at a touched position may be selected.

The operating interface 24 realized as a touch panel receives a user operation of touching the display screen of the display 23. The operating interface 24 outputs positional information indicative of the position on the display screen that is touched by the user. For example, the positional information is represented by a coordinate (x, y) on an x-y plane where the left upper end of the display screen is the origin, the rightward direction is the positive direction of the x-axis, and the downward direction is the positive direction of the y-axis. As a touch sensor, a known type such as a capacitance type and a resistive type may be adopted.

The term "touch" in this specification includes all operations that an input medium touches the display screen. That is, the examples of touch operations include a tap operation of separating a touched input medium from the display screen in a particular period, a long touch operation of making the touched input medium still on the display screen, a slide operation of sliding the touched input medium on the display screen, a flick operation of sliding the touched input medium on the display screen at acceleration higher than or equal to a threshold, a pinch-in operation of sliding two input mediums touching at different positions on the display screen in directions approaching each other, a pinch-out operation of sliding two input mediums touching at different positions on the display screen in directions separating from each other, and so on.

The above-mentioned "touch" may also include that an input medium is moved to a position that is very close to the display screen although the input medium is not touching the display screen. Further, the input medium may be a finger of a user, or may be a touch pen, or the like. Hereinafter, descriptions will be provided by taking a tap on the position of an icon displayed on the display 23 as an example of the user operation of selecting the icon.

[USB Interface 25]

The USB interface 25 is an interface to which the USB cable 101 is connected. The firmware installed in the USB interface 25 outputs a control signal based on an electrical signal inputted from the USB cable 101 to various programs described later, and outputs an electrical signal based on a control signal inputted from various programs to the USB cable 101.

[Wi-Fi Communicator 26]

The Wi-Fi communicator 26 is an interface for performing communication with an external apparatus. Specifically, the Wi-Fi communicator 26 performs communication with the information processing terminal 50 by way of the access point 102. The Wi-Fi communicator 26 of the present embodiment performs communication with the information processing terminal 50 in a procedure compatible with the TCP (Transmission Control Protocol)/IP standard, for example. Further, the Wi-Fi communicator 26 of the present embodiment performs communication with the access point 102 in a procedure compatible with the IEEE802.11 standard, Wi-Fi™ (Trademark of Wi-Fi Alliance), for example.

[CPU 31]

The CPU (Central Processing Unit) 31 controls the entire operation of the MFP 10. The CPU 31 acquires and executes various programs described later from the storage 32, based on various information outputted from the operating interface 24 and on various information and so on acquired from an external apparatus through the USB interface 25 and the Wi-Fi communicator 26. That is, the CPU 31 and the storage 32 constitute an example of a controller or an apparatus controller.

[Storage 32]

The storage 32 has a program storage area 32A and a data storage area 32B. The program storage area 32A stores an OS (Operating System) 34 and an apparatus program 35. The OS 34 and the apparatus program 35 are programs built in a binary format. The apparatus program 35 may be a single program, or may be a combination of a plurality of programs. The data storage area 32B stores data or information needed for executing the apparatus program 35.

Here, both of "data" and "information" in this specification are a bit or a bit array that can be handled by a computer. The "data" is one that can be handled by a computer without considering the meaning of each bit. In contrast, the "information" is one that the operation of the computer branches depending on the meaning of each bit. Further, "instruction" is a control signal for prompting a transmission-destination apparatus to perform the next operation. The "instruction" sometimes includes information, and the "instruction" itself sometimes has a property of information.

Even if the format (for example, text format, binary format, flag format, and so on) is changed depending on each computer, "data" and "information" are treated as the same data and information as long as it has the same meaning. For example, information indicative of "two" may be kept as text format information "0x32" in ASCII code in a certain computer, and may be kept as binary format information "10" in another computer.

However, the above-described definitions of the "data" and "information" are not strict one, and there are also exceptions. For example, data may be temporarily treated as information, and information may be temporarily treated as data. Further, one treated as data in a certain apparatus may be treated as information in another apparatus. Further, information may be taken out of data, and data may be taken out of information.

The storage 32 includes, for example, a RAM (Random Access Memory), a ROM (Read Only Memory), an EEPROM (Electrically Erasable Programmable Read-Only Memory), a HDD (Hard Disk Drive), a buffer provided in the CPU 31, and so on, or a combination thereof.

The storage 32 may be a computer-readable storage medium. The computer-readable storage medium is a non-transitory medium. The non-transitory medium also includes recording mediums such as a CD-ROM and a DVD-ROM, in addition to the above-described examples. The non-transitory medium is a tangible medium. On the other hand, an electric signal conveying a program downloaded from a server or the like on the Internet is a computer-readable signal medium that is a kind of a computer-readable medium, but is not included in the non-transitory computer-readable storage medium.

The CPU 31 executes programs stored in the program storage area 32A. In this specification, however, operations of each program are sometimes described while omitting the CPU 31. That is, in the following description, a sentence "a program A executes a process A" may mean that "the CPU 31 executes the process A described in the program A".

The program stored in the program storage area 32A determines an event and operates depending on the determination result. In this specification, however, operations of each program are sometimes described while omitting such determination. That is, in the following description, a sentence "a program executes a process A depending on a condition A" may mean that "The program determines whether a condition A is satisfied. The program executes the process A in response to a positive determination".

The program stored in the program storage area 32A identifies, extracts, or selects data and so on. The phrase "program identifies data and so on" indicates, for example, a process of identifying data matching a condition from among a plurality of data and so on and of storing, in a predetermined storage area, the data and so on itself or information for identifying the data and so on. The information for identifying data and so on includes, for example, identification information for identifying the data and so on, an index of an array in which the data and so on are stored, a pointer of a storage area in which the data and so on are stored, and so on. The same goes for a process that a program extracts or selects data and so on.

The program stored in the program storage area 32A acquires data and so on. The phrase "program acquires data and so on" may indicate, for example, a process of reading out data from a storage area in which the data is stored. The phrase "program acquires data and so on" may indicate, for example, a process of receiving data transmitted from an external apparatus. The phrase "program acquires data and so on" may indicate, for example, a process of requesting an external apparatus to return data and of receiving the data returned from the external apparatus. The phrase "program acquires data and so on" may indicate, for example, a process of receiving data outputted from another program such as the OS. The phrase "program acquires data and so on" may indicate, for example, a process of requesting another program to output data and of receiving the data outputted from the other program.

The OS 34 is a basic program that provides API (Application Programming Interface) for controlling the printer 11, the scanner 12, the FAX interface 13, the display 23, the operating interface 24, the USB interface 25, the Wi-Fi communicator 26, and so on, that are hardware elements constituting the MFP 10. That is, the above-described each program controls each hardware element by calling the API provided by the OS 34. In this specification, however, the operations of each program may be described while omitting the OS 34. That is, in the following description, the phrase "program B controls hardware C" may mean that "program B controls hardware C through the API of the OS 34".

The descriptions of basic operation of the above-described program may be similarly applied not only to the program stored in the program storage area 32A but also to each program stored in a program storage area 62A of the information processing terminal 50 described later.

Figure 3A:
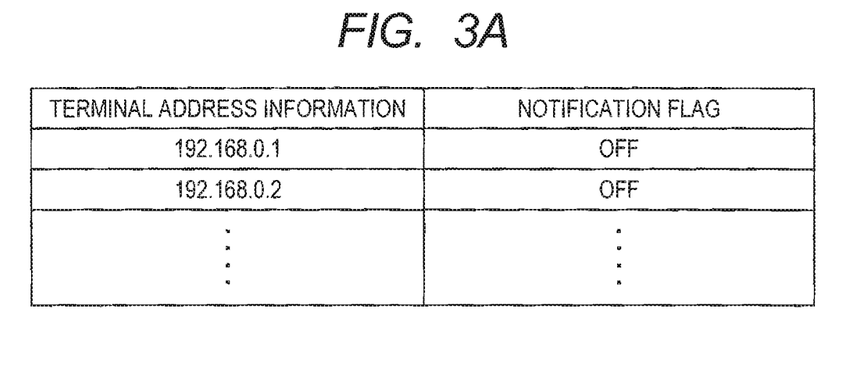
FIG. 3A shows a terminal list and FIGS. 3B and 3C each show a device list.

As shown in FIG. 3A, the data storage area 32B is configured to store terminal address information and a notification flag associated with the terminal address information. Hereinafter, the information shown in FIG. 3A may be collectively referred to as "terminal list", and each record shown in FIG. 3A may be referred to as "terminal record". The terminal list may include a plurality of terminal records. In FIG. 3A, the terminal record of the first line corresponds to the information processing terminal 50A, and the terminal record of the second line corresponds to the information processing terminal 50B.

The terminal address information is address information allocated to a Wi-Fi communicator 56 of the information processing terminal 50. FIG. 3A shows IP addresses as an example of the terminal address information. The notification flag is information indicative of whether setting notification information described later has been transmitted to the information processing terminal 50 to which the corresponding terminal address information is allocated. The notification flag has a value of either a first value indicating that the setting notification information has not yet been transmitted (hereinafter referred to as "OFF") or a second value indicating that the setting notification information has already been transmitted (hereinafter referred to as "ON").

Although not shown in the drawings, the data storage area 32B stores apparatus information. The apparatus information is information needed when the information processing terminal 50 transmits, to the MFP 10, formation instructing information that instructs the MFP 10 to perform an image forming operation. A specific example of the apparatus information is not limited, but may be a vendor ID, a product ID, and so on. The apparatus information is information that is set by a manufacturer in the manufacturing process of the MFP 10, for example.

Although not shown in the drawings, the data storage area 32B is configured to store apparatus address information. The apparatus address information is address information allocated to the Wi-Fi communicator 26. The apparatus address information may be information that is set when the apparatus is connected to a wireless LAN (for example, an IP address or a subnet mask), or may be information that is already set at the time of shipment of the MFP 10 (for example, a MAC address). The apparatus address information may be stored in a memory mounted in the Wi-Fi communicator 26.

[Information Processing Terminal 50]

Figure 2B:
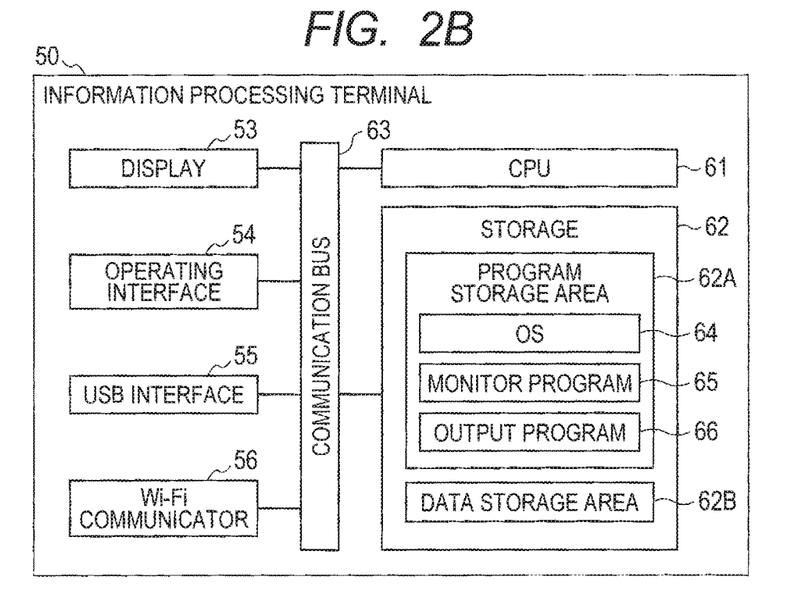
FIG. 2B is a functional block diagram of an information processing terminal 50.

As shown in FIG. 2B, the information processing terminal 50 mainly includes a display 53, an operating interface 54, the USB interface 55, the Wi-Fi communicator 56, a CPU 61, a storage 62, and a communication bus 63. The display 53, the operating interface 54, the USB interface 55, the Wi-Fi communicator 56, the CPU 61, the storage 62, and the communication bus 63 included in the information processing terminal 50 are basically the same as the display 23, the operating interface 24, the USB interface 25, the Wi-Fi communicator 26, the CPU 31, the storage 32, and the communication bus 33 included in the MFP 10. Thus, detailed descriptions will not be repeated.

The information processing terminal 50 may be a mobile phone, a smart phone, a tablet device, or a PC (Personal Computer), for example. The CPU 61 and the storage 62 constitute an example of a terminal controller. The USB interface 55 is an example of a third communicator. The Wi-Fi communicator 56 is an example of a fourth communicator.

The program storage area 62A is configured to store an OS 64, a monitor program 65, and an output program 66. The monitor program 65 receives various kinds of information from the MFP 10, and displays the state of the MFP 10 indicated by the received information on the display 53. The state of the MFP 10 displayed on the display 53 is, for example, starting or ending of an image forming operation, a remaining amount of ink or toner, a paper jam, out of paper, or a fact that setting change of a device record described later is needed, and so on.

The output program 66 is a so-called device driver that transmits formation instructing information to the MFP 10, in accordance with an instruction from an application program (not shown) installed in the information processing terminal 50. Specifically, the output program 66 transmits formation instructing information to the MFP 10 defined in the device record described later through an interface defined in the device record (for example, the USB interface 55 or the Wi-Fi communicator 56). That is, when information included in the device record changes, an operation of the output program 66 changes. Changing of information included in the device record is an example of the setting change of the output program 66. Note that a plurality of output programs 66 may be installed in the information processing terminal 50.

Figure 3B:
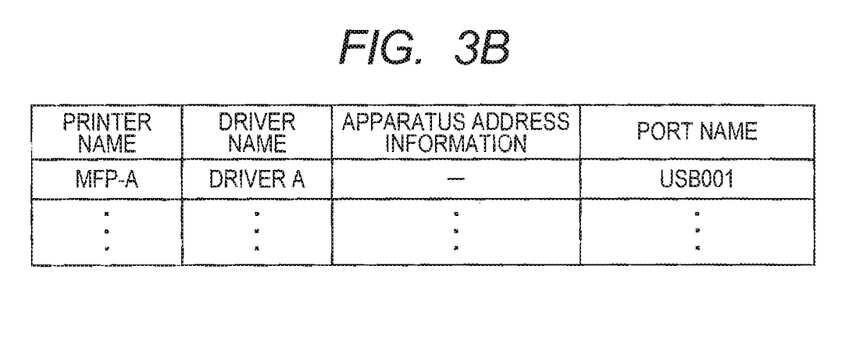

As shown in FIG. 3B, the data storage area 62B stores a printer name, a driver name, apparatus address information, and a port name in association with one another. Hereinafter, information shown in FIG. 3B may be collectively referred to as "device list", and each record shown in FIG. 3B may be referred to as "device record". The device list may include a plurality of device records. The same goes for FIG. 3C.

The printer name is information for identifying the MFP 10. The printer name may be acquired from the MFP 10, or may be arbitrarily allocated by a user of the information processing terminal 50. The driver name is information identifying the output program 66 that transmits formation instructing information to the MFP 10 identified by the corresponding printer name. In the first embodiment, it is assumed that the driver name of the output program 66 is "driver A". The apparatus address information is address information allocated to the Wi-Fi communicator 26 of the MFP 10 identified by the corresponding printer name. The port name is information indicative of a logical communication path for transmitting formation instructing information to the MFP 10. For example, the port name may include information that identifies the MFP 10, information that identifies an interface for transmitting formation instructing information to the MFP 10, and so on.

The device record indicates that the output program 66 indicated by the driver name can transmit formation instructing information to the MFP 10 indicated by the printer name through a logical communication path indicated by the port name. In the first embodiment, the device record shown in FIG. 3B indicates that the output program 66 is configured to transmit formation instructing information to the MFP 10 through the USB interface 55. Further, the device record shown in FIG. 3C indicates that the output program 66 is configured to transmit formation instructing information to the MFP 10 through the Wi-Fi communicator 56. As shown in FIG. 3B, no apparatus address information is set to a device record for transmitting formation instructing information through the USB cable 101.

Although not shown in the drawings, the data storage area 62B is configured to store terminal address information. The terminal address information is address information allocated to the Wi-Fi communicator 56. The terminal address information may be information that is set when the terminal is connected to a wireless LAN (for example, an IP address or a subnet mask), or may be information that is already set at the time of shipment of the information processing terminal 50 (for example, a MAC address). The terminal address information may be stored in a memory mounted in the Wi-Fi communicator 56.

[Operation of Monitor System 100]

Figure 4:
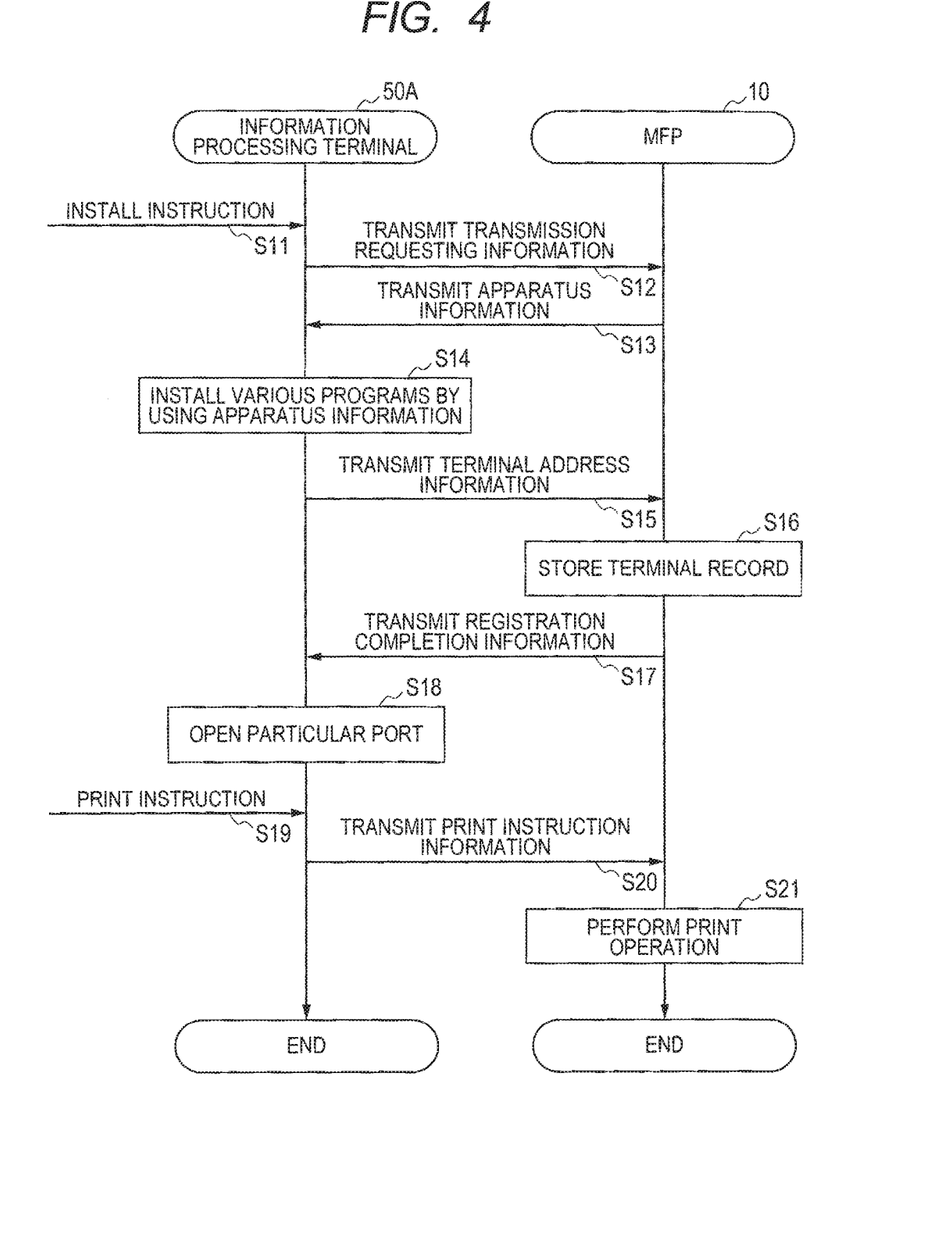
FIG. 4 is a sequence chart showing processes for allowing the information processing terminal 50 to cause the MFP 10 to perform an image forming operation through a USB cable 101.

The operations of the monitor system 100 according to the first embodiment will be described while referring to FIGS. 4 and 5. The monitor system 100 according to the first embodiment executes a process in which the information processing terminal 50A generates a device record and the information processing terminal 50A controls the MFP 10 to perform an image forming operation by using that device record. In the first embodiment, an example is described in which the MFP 10 performs a print operation as an example of the image forming operation, but the image forming operation performed by the MFP 10 may be a scanner operation, a FAX transmission-reception operation, and so on.

A process will be described while referring to FIG. 4, in which the information processing terminal 50 generates the device record shown in FIG. 3B and the information processing terminal 50A controls the MFP 10 to perform a print operation by using that device record. Here, it is assumed that the MFP 10 and the information processing terminal 50A are connected to each other by the USB cable 101.

In response to receiving a user operation of instructing installing of the output program 66 or a user operation of instructing generation of a device record through the operating interface 54 (S11), the information processing terminal 50A transmits transmission requesting information to the MFP 10 through the USB interface 55 (S12). The transmission requesting information is information for requesting transmission of apparatus information. The process of S12 executed by the information process terminal 50A is an example of a second transmitting process. For example, in response to setting of an install CD provided from the manufacturer of the MFP 10 onto a CD drive (not shown), the processes of S11 to S17 may be executed by a known installer program.

Next, the apparatus program 35 of the MFP 10 receives the transmission requesting information from the information processing terminal 50A through the USB interface 25 (S12). The apparatus program 35 then reads out apparatus information stored in the data storage area 32B, and transmits the read apparatus information to the information processing terminal 50A through the USB interface 25 (S13). The process of S12 executed by the MFP 10 is an example of a first receiving process. The process of S13 executed by the MFP 10 is an example of a first transmitting process.

Next, the information processing terminal 50A receives the apparatus information from the MFP 10 through the USB interface 55 (S13). The process of S13 executed by the information processing terminal 50A is an example of a second receiving process. Next, the information processing terminal 50A installs the monitor program 65 and the output program 66 recorded on the install CD, and generates the device record shown in FIG. 3B and adds the generated device record to the device list (S14).

This process enables the output program 66 to transmit formation instructing information to the MFP 10 through the USB interface 55, in accordance with the device record generated in S14. Note that, if the monitor program 65 and the output program 66 are already installed, the install process is omitted. Next, the information processing terminal 50A reads out terminal address information stored in the data storage area 62B, and transmits the read terminal address information to the MFP 10 through the USB interface 55 (S15).

Next, the apparatus program 35 of the MFP 10 receives the terminal address information, through the USB interface 25, from the information processing terminal 50A that is the transmission destination of the apparatus information (S15). Next, the apparatus program 35 adds, to the terminal list, a terminal record including the terminal address information received in S15 and the notification flag "OFF" (S16). That is, the terminal record is indicative of the information processing terminal 50 to which the apparatus information has been transmitted through the USB interface 25. The apparatus program 35 then transmits registration completion information to the information processing terminal 50A through the USB interface 25 (S17). The registration completion information is information for notifying that registration of the terminal address information is completed (that is, the terminal address information is stored). The process of S15 executed by the MFP 10 is an example of a second receiving process. The process of S16 is an example of a storing process.

Next, the information processing terminal 50A receives the registration completion information from the MFP 10 through the USB interface 55 (S17). The monitor program 65 then opens one of TCP ports of the Wi-Fi communicator 56 (hereinafter referred to as "particular port") (S18). This process enables the information processing terminal 50A to receive information transmitted to the particular port, through the Wi-Fi communicator 56. The process of S18 is an example of a reception preparing process of obtaining a state in which information can be received from the MFP 10 through the Wi-Fi communicator 56.

More specifically, opening the particular port means that setting is performed such that SYN/ACK packet is returned in response to SYN packet transmitted to the particular port. The SYN packet is a packet in which "1" is set to the SYN bit of the TCP header and "0" is set to the ACK bit. The SYN/ACK packet is a packet in which "1" is set to the SYN bit of the TCP header and "1" is set to the ACK bit. On the other hand, in a state before the particular port is opened, setting is performed such that RST/ACK packet is returned in response to SYN packet transmitted to the particular port.

For example, the timing of executing the process of S18 may be immediately after S14 or immediately after S15. That is, the monitor program 65 may execute the process of S18 in response to addition of the device record, in other words, in response to that the output program 66 is set such that formation instructing information can be transmitted to the MFP 10 through the USB interface 55. The port number of the particular port may be preliminarily set. Or, the information processing terminal 50A may notify the MFP 10 about the port number in S15. Or, the MFP 10 may notify the information processing terminal 50A about the port number in S17. Further, the port number of the particular port may be included in the terminal record.

Next, the output program 66 acquires a print instruction of instructing the MFP 10 to perform a print operation from an application program (not shown) installed in the information processing terminal 50A (S19). For example, the print instruction includes information identifying both image data that is the target of a print operation and a device record used for transmitting print instruction information. The output program 66 transmits the print instruction information to the MFP 10 through the USB interface 55, in accordance with the device record specified by the print instruction (S20). The print instruction information is an example of formation instructing information for instructing the MFP 10 to perform a print operation. For example, the print instruction information includes image data specified by the print instruction.

Next, the apparatus program 35 of the MFP 10 receives the print instruction information from the information processing terminal 50A through the USB interface 25 (S20). The apparatus program 35 then causes the printer 11 to perform a print operation, in accordance with the print instruction information received in S20 (S21). That is, the printer 11 records the image indicated by image data included in the print instruction information on recording paper. The process of S20 executed by the MFP 10 is an example of a fourth receiving process. The process of S21 is an example of an operation controlling process.

Next, a process will be described while referring to FIG. 5, in which the information processing terminal 50 generates the device record shown in FIG. 3C, and the information processing terminal 50A controls the MFP 10 to perform a print operation by using that device record. Here, it is assumed that the MFP 10 and the information processing terminal 50A are connected to each other by the USB cable 101. Further, it is assumed that, at the time of starting the process of FIG. 5, the MFP 10 is not connected to the wireless LAN and the information processing terminal 50A is connected to the wireless LAN.

First, the apparatus program 35 of the MFP 10 monitors that information for connecting to the wireless LAN is set to the Wi-Fi communicator 26 (S31). For example, the information for connecting to the wireless LAN may be an IP address, an SSID (Service Set IDentifier), and so on. The IP address may be inputted by a user through the operating interface 24, or may be acquired from a DHCP (Dynamic Host Configuration Protocol) server (not shown). Similarly, the SSID may be inputted by a user through the operating interface 24, or may be acquired from the access point 102 by AOSS (AirStation One-Touch Secure System) or the like.

Next, the apparatus program 35 detects whether the Wi-Fi communicator 26 is connected to the wireless LAN (S32). More specifically, the apparatus program 35 detects whether the MFP 10 is in a state of being capable of communicating with the access point 102 by using the information set in S31. Next, the apparatus program 35 determines whether a terminal record is stored in the terminal list (S33). More specifically, the apparatus program 35 determines whether a terminal record including the notification flag "OFF" is stored in the terminal list. The process of S32 is an example of a detecting process. The process of S33 is an example of a determining process.

Figure 7A:
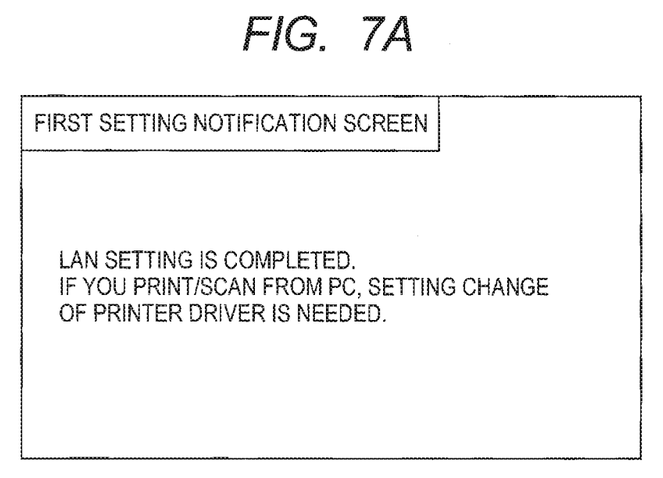
FIG. 7A shows a first setting notification screen and FIG. 7B shows a second setting notification screen.

Then, in response to detecting that the Wi-Fi communicator 26 is connected to the wireless LAN and to determining that the terminal record is stored in the terminal list (S32: Yes & S33: Yes), the apparatus program 35 displays a first setting notification screen on the display 23 (S34). The first setting notification screen is a screen for notifying that setting change of the information processing terminal 50 is needed for transmitting formation instructing information through the wireless LAN. FIG. 7A is an example of the first setting notification screen. The first setting notification screen shown in FIG. 7A includes a message "LAN setting is completed. If you print/scan from PC, setting change of printer driver is needed." The process of S34 is an example of a notifying process.

The apparatus program 35 reads out one of terminal records including the notification flag "OFF" from the terminal list. The apparatus program 35 then transmits setting notification information, through the Wi-Fi communicator 26, to the information processing terminal 50A identified by the terminal address information included in the read terminal record (S35). The setting notification information is transmitted to the particular port that is opened in S18. The setting notification information is information indicating that setting change of the information processing terminal 50 is necessary for transmitting formation instructing information through the wireless LAN. The setting notification information includes apparatus address information set to the Wi-Fi communicator 26, for example. The process of S35 executed by the MFP 10 is an example of a second transmitting process.

The apparatus program 35 sets "ON" to the notification flag of the read terminal record (S36). The apparatus program 35 then executes the processes of S35, S36 for all the terminal records including the notification flag "OFF" (S37). On the other hand, in response to detecting that the Wi-Fi communicator 26 is connected to the wireless LAN and to determining that no terminal record including the notification flag "OFF" is stored in the terminal list (S32: Yes & S33: No), the apparatus program 35 skips the processes of S34 to S37.

Figure 7B:
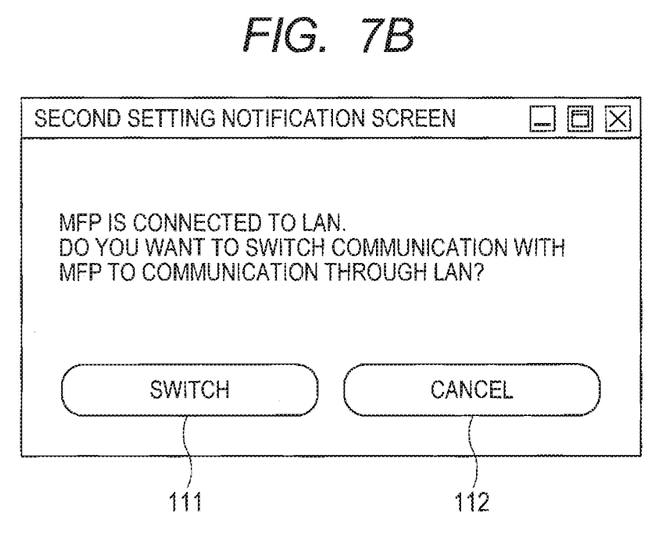

Next, the monitor program 65 of the information processing terminal 50A receives the setting notification information transmitted to the particular port from the MFP 10 through the Wi-Fi communicator 56 (S35). The monitor program 65 then displays a second setting notification screen on the display 53 in accordance with the setting notification information received in S35 (S38). The second setting notification screen is a screen for notifying that setting change of the output program 66 is needed, in other words, change of the device record is needed. FIG. 7B is an example of the second setting notification screen. The second setting notification screen shown in FIG. 7B includes a message "MFP is connected to LAN. Do you want to switch communication with MFP to communication through LAN?", a [Switch] icon 111, and a [Cancel] icon 112. The process of S35 executed by the information processing terminal 50A is an example of a receiving process, and the process of S38 is an example of a notifying process.

The [Switch] icon 111 corresponds to an instruction of performing setting change of the output program 66. The [Cancel] icon 112 corresponds to an instruction of not performing setting change of the output program 66. In response to receiving a user operation of tapping the position of the [Switch] icon 111 through the operating interface 54 (S39: Yes), the monitor program 65 performs setting change of the output program 66 (S40). On the other hand, in response to receiving a user operation of tapping the position of the [Cancel] icon 112 through the operating interface 54 (S39: No), the monitor program 65 skips the process S40.

Figure 3C:
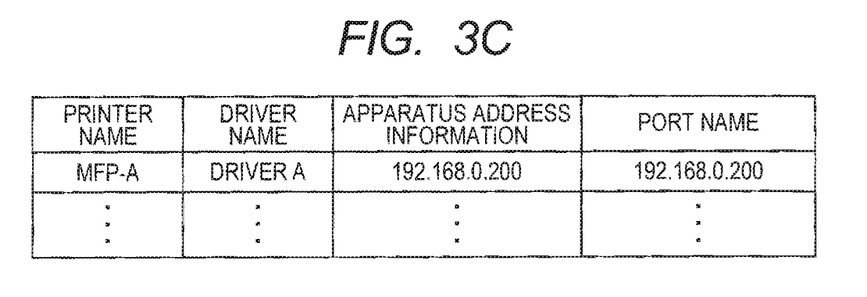

More specifically, in S40 the monitor program 65 generates the device record shown in FIG. 3C by using apparatus address information included in the setting notification information received in S35. The monitor program 65 then replaces (overwrites) the device record shown in FIG. 3B with the generated device record. The tap of the [Switch] icon 111 is an example of an instruction operation of instructing the setting change of the output program 66. The process of S39 is an example of an operation receiving process. The process of S40 is an example of a setting process.

Next, the output program 66 acquires a print instruction of instructing the MFP 10 to perform a print operation, from an application program (not shown) installed in the information processing terminal 50A (S41). The output program 66 then transmits print instruction information to the MFP 10 through the Wi-Fi communicator 56, in accordance with the device record specified by the print instruction (S42). The apparatus program 35 of the MFP 10 receives the print instruction information from the information processing terminal 50A through the Wi-Fi communicator 26 (S42). The apparatus program 35 then controls the printer 11 to perform a print operation in accordance with the print instruction information received in S42 (S43). The processes of S41 to S43 may be the same as the processes of S19 to S21, except that the print instruction information is transmitted and received through the wireless LAN.

Effects of the First Embodiment

According to the first embodiment, it is notified that the setting change of the information processing terminal 50A is needed at the timing when the MFP 10 is connected to the wireless LAN, in other words, at the timing when communication is enabled between the information processing terminal 50 and the MFP 10 through the wireless LAN. That is, the setting change of the information processing terminal 50A can be prompted at appropriate timing. According to the first embodiment, the second setting notification screen is displayed on the display 53 of the information processing terminal 50A by transmitting the setting notification information. As a result, even if the information processing terminal 50A is installed at a place away from the MFP 10, the user of the information processing terminal 50A can be notified at appropriate timing that the setting change is needed.

According to the first embodiment, the processes of S34 to S37 are executed when the terminal record including the notification flag "OFF" is stored in the terminal list. Here, a case in which the terminal record is not stored in the terminal list means, for example, that there is no information processing terminal 50 that can transmit formation instructing information through the USB cable 101. On the other hand, a case in which "ON" is set to the notification flag of all the terminal records means, for example, that the setting notification information has already been transmitted to all the information processing terminals 50 that can transmit formation instructing information to the MFP 10 through the USB cable 101. The user of the information processing terminal 50 in this case is likely to be aware that the setting change is needed for transmitting formation instructing information to the MFP 10, and hence the processes of S34 to S37 need not be executed.

According to the first embodiment, in response to specifying the [Switch] icon 111 of the second setting notification screen, the device record shown in FIG. 3C is stored in the device list, in place of the device record shown in FIG. 3B. With this process, the setting change of the output program 66 can be performed smoothly without troubling the user. In S40 of the first embodiment, an example is described in which the device record is overwritten. However, the device record shown in FIG. 3C may be added to the device list shown in FIG. 3B. That is, two device records shown in FIGS. 3B and 3C may be stored in the device list. This process enables the output program 66 to transmit formation instructing information to the MFP 10 through both of the USB interface 55 and the Wi-Fi communicator 56.

Only either one of the process of S34 and the processes of S35 to S37 may be executed, and the other one may be omitted. Also, determination of S33 may be omitted, and the processes of S34 and thereafter may be executed in response to detecting that the Wi-Fi communicator 26 is connected to the wireless LAN. Further, the [Switch] icon 111 in the second setting notification screen may be omitted, and the change of the device record may be manually performed by the user.

Second Embodiment

Figure 6:
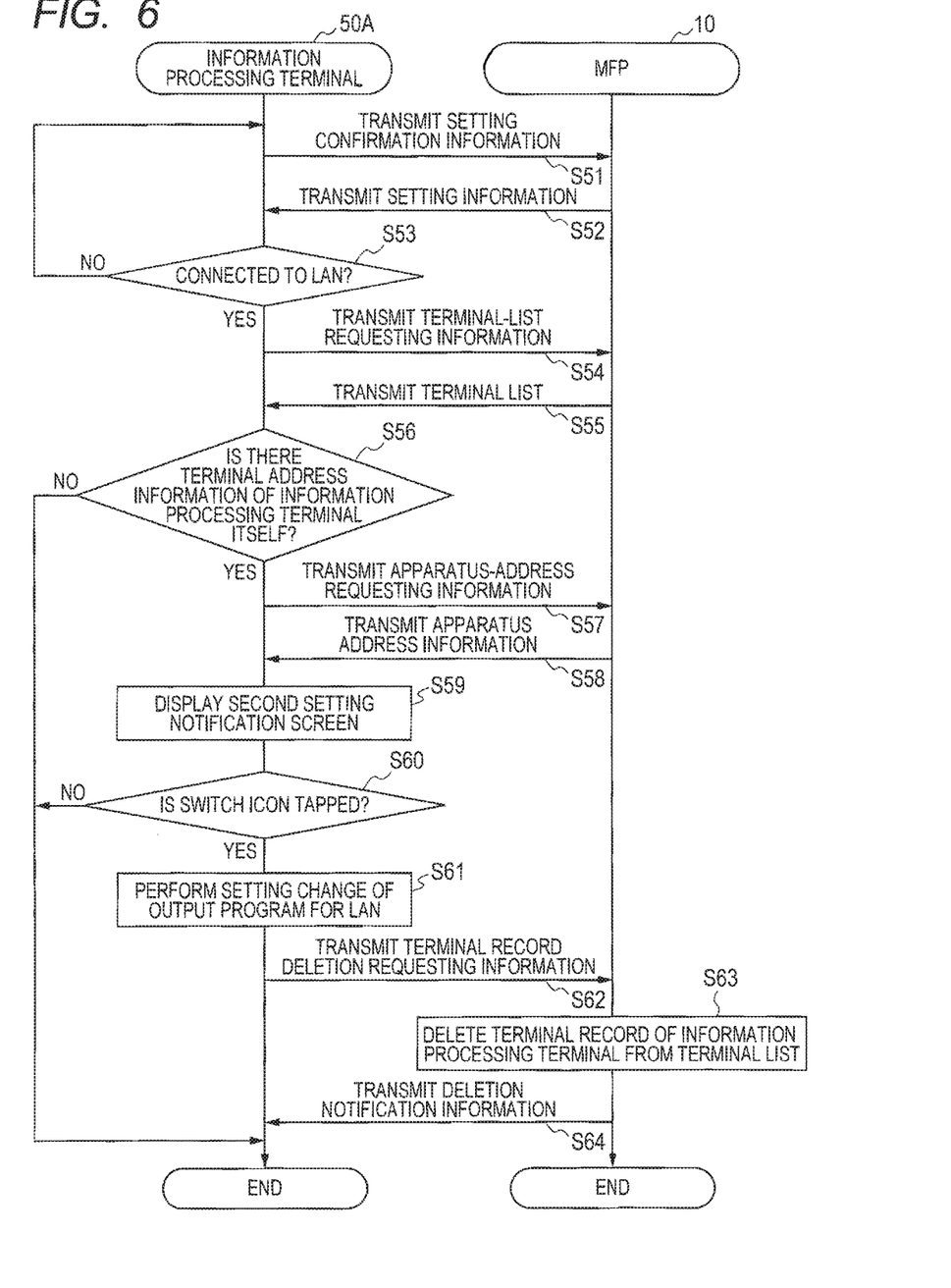
FIG. 6 is a sequence chart showing processes of a second embodiment for allowing the information processing terminal 50 to cause the MFP 10 to perform an image forming operation through a communication network.

Next, the operations of the monitor system 100 according to a second embodiment will be described while referring to FIG. 6. Here, descriptions for the same processes as those in the first embodiment will be omitted and only differences will be described. The monitor system 100 according to the second embodiment differs from the first embodiment in that the information processing terminal 50A monitors whether the MFP 10 is connected to wireless LAN.

First, in response to executing the processes of S11 to S17, the monitor program 65 of the information processing terminal 50A transmits setting confirmation information to the MFP 10 through the USB interface 55 (S51). The setting confirmation information is information for requesting the MFP 10 to transmit setting information indicative of whether the MFP 10 is connected to the wireless LAN.

The apparatus program 35 of the MFP 10 receives the setting confirmation information from the information processing terminal 50A through the USB interface 25 (S51). The apparatus program 35 then determines whether the MFP 10 is connected to the wireless LAN. More specifically, the apparatus program 35 may determine whether an IP address or an SSID is set to the Wi-Fi communicator 26 by executing the processes similar to S31, S32 of FIG. 5, or may determine whether the apparatus program 35 is configured to perform communication with the access point 102 at this time. The apparatus program 35 then transmits setting information indicative of this determination result to the information processing terminal 50A through the USB interface 25 (S52).

Next, the monitor program 65 of the information processing terminal 50A receives the setting information from the MFP 10 through the USB interface 55 (S52). The monitor program 65 then determines whether the MFP 10 is connected to the wireless LAN based on the setting information received in S52 (S53). In response to determining that the MFP 10 is not connected to the wireless LAN (S53: No), the monitor program 65 again executes the process of S51 after a particular time elapses. That is, until the monitor program 65 determines that the MFP 10 is connected to the wireless LAN (S53: Yes), the monitor program 65 repeatedly executes the processes of S51, S52 at a particular time interval.

Next, in response to determining that the MFP 10 is connected to the wireless LAN (S53: Yes), the monitor program 65 transmits terminal-list requesting information to the MFP 10 through the USB interface 55 (S54). The terminal-list requesting information is information for requesting transmission of the terminal list stored in the MFP 10. The apparatus program 35 of the MFP 10 receives the terminal-list requesting information from the information processing terminal 50A through the USB interface 25 (S54). The apparatus program 35 then reads out the terminal list stored in the data storage area 32B, and transmits the read terminal list to the information processing terminal 50A through the USB interface 25 (S55).

The monitor program 65 of the information processing terminal 50A receives the terminal list from the MFP 10 through the USB interface 55 (S55). The monitor program 65 then determines whether there is a terminal record including the terminal address information set to the Wi-Fi communicator 56 in the terminal list received in S55 (S56). In response to determining that there is a terminal record including the terminal address information of the information processing terminal 50A itself (S56: Yes), the monitor program 65 transmits apparatus-address requesting information to the MFP 10 through the USB interface 55 (S57). The apparatus-address requesting information is information for requesting transmission of the apparatus address information set to the Wi-Fi communicator 26 of the MFP 10. The process of S57 executed by the information processing terminal 50A is an example of a transmitting process.

The apparatus program 35 of the MFP 10 receives the apparatus-address requesting information from the information processing terminal 50A through the USB interface 25 (S57). The apparatus program 35 then transmits apparatus address information set to the Wi-Fi communicator 26 to the information processing terminal 50A through the USB interface 25 (S58). That is, in response to detecting that the Wi-Fi communicator 26 is connected to the wireless LAN and to receiving the apparatus-address requesting information from the information processing terminal 50A, the apparatus program 35 transmits the apparatus address information to the information processing terminal 50A that is the transmission source of the apparatus-address requesting information. The process of S57 executed by the MFP 10 is an example of a third receiving process. The process of S58 executed by the MFP 10 is an example of a third transmitting process.

Next, the monitor program 65 of the information processing terminal 50A receives the apparatus address information from the MFP 10 through the USB interface 55 (S58). The process of S58 executed by the information processing terminal 50A is an example of a receiving process. The monitor program 65 then executes the processes of S59, S60, and S61. The processes of S59, S60, and S61 may be the same as the processes of S38, S39, and S40.

The monitor program 65 transmits terminal-record deletion requesting information to the MFP 10 through the Wi-Fi communicator 56 (S62). The terminal-record deletion requesting information is information for requesting deletion of the terminal record of the information processing terminal 50A itself, stored in the terminal list. The apparatus program 35 of the MFP 10 receives the terminal-record deletion requesting information from the information processing terminal 50A through the Wi-Fi communicator 26 (S62). The apparatus program 35 deletes the terminal record of the information processing terminal 50A stored in the terminal list (S63). The apparatus program 35 then transmits deletion notification information to the information processing terminal 50A through the Wi-Fi communicator 26 (S64). The monitor program 65 of the information processing terminal 50A receives the deletion notification information from the MFP 10 through the Wi-Fi communicator 56 (S64).

Further, the monitor system 100 according to the second embodiment may execute the processes corresponding to S41 to S43 after executing the process of S64. On the other hand, in response to determining that there is no terminal record including the terminal address information of the information processing terminal 50A itself (S56: No), the monitor program 65 skips the processes of S57 to S64. For example, in a case where S63 is executed in the process of FIG. 6 and the terminal record of the information processing terminal 50A is deleted and then the process of FIG. 6 is executed again, there is no terminal record of the information processing terminal 50A itself and thus negative determination is made in S56.

Effects of the Second Embodiment

Figure 5:
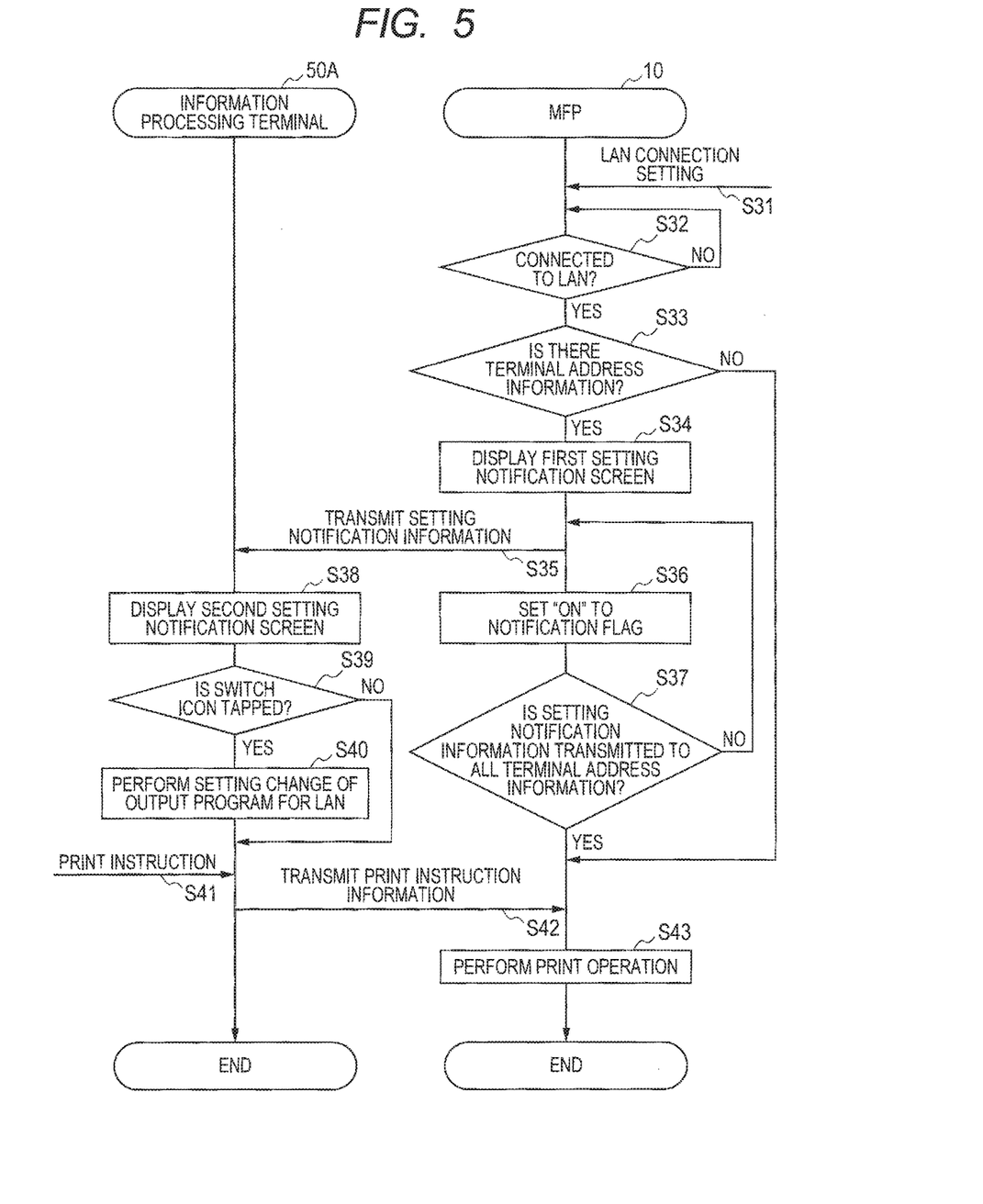
FIG. 5 is a sequence chart showing processes for allowing the information processing terminal 50 to cause the MFP 10 to perform an image forming operation through a communication network.

According to the second embodiment, the effects similar to those of the processes in FIG. 5 of the first embodiment can be obtained. Further, if the processes of the second embodiment are executed, it is not necessary to open the particular port in S18 of FIG. 4. Thus, deterioration of security of the information processing terminal 50A can be suppressed. Note that the MFP 10 and the information processing terminal 50A may transmit and receive various information through the wireless LAN in S51 to S58 of FIG. 6.

As one example, the MFP 10 and the information processing terminal 50A transmit and receive various kinds of information through the USB cable 101 in S51, S52, S57, and S58. The monitor program 65 of the information processing terminal 50A may transmit the terminal-list requesting information to the MFP 10 identified by the received apparatus address information through the Wi-Fi communicator 56, and may receive the terminal list from the MFP 10 through the Wi-Fi communicator 56. Similarly, the apparatus program 35 of the MFP 10 may receive the terminal-list requesting information from the information processing terminal 50A through the Wi-Fi communicator 26, and may transmit the terminal list to the information processing terminal 50A through the Wi-Fi communicator 26.

As another example, the monitor program 65 of the information processing terminal 50A may broadcast existence confirmation information including the apparatus information received in S13 through the Wi-Fi communicator 56. On the other hand, the apparatus program 35 of the MFP 10 may receive existence confirmation information from the information processing terminal 50A through the Wi-Fi communicator 26, and may determine whether apparatus information included in the received existence confirmation information is the apparatus information of the apparatus itself. In response to determining that the apparatus information of the apparatus itself is included in the existence confirmation information, the apparatus program 35 may transmit existence information to the information processing terminal 50A through the Wi-Fi communicator 26. On the other hand, in response to determining that the apparatus information of the apparatus itself is not included in the existence confirmation information, the apparatus program 35 may not respond to the existence confirmation information.

If the existence information cannot be received when a particular time elapses after the existence confirmation information is transmitted, the monitor program 65 of the information processing terminal 50 may again broadcast the existence confirmation information through the Wi-Fi communicator 56. On the other hand, in response to receiving the existence information from the MFP 10 through the Wi-Fi communicator 56, the monitor program 65 may transmit the terminal-list requesting information to the MFP 10 through the Wi-Fi communicator 56 and may receive the terminal list from the MFP 10 through the Wi-Fi communicator 56. In this case, the IP header of the existence information includes apparatus address information, and hence the processes of S57, S58 are omitted.

An example is described in which the CPUs 31, 61 execute various programs stored in the program storage areas 32A, 62A of the storage 32, 62 in the MFP 10 and the information processing terminal 50 of each embodiment, thereby realizing each process executed by the controller of this disclosure. However, the configuration of the controller is not limited to this, and a part or an entirety of the controller may be realized by hardware such as an IC (Integrated Circuit) and so on.

This disclosure may be realized not only as the MFP 10 and the information processing terminal 50 but also as a program for controlling the MFP 10 and the information processing terminal 50 to execute processes. This program may be provided by a non-transitory recording medium. In addition to a CD-ROM, a DVD-ROM, and so on, a non-transitory recording medium may include a storage mounted on a server configured to be connected to the MFP 10 and the information processing terminal 50 through a communication network. The program stored in the storage of the server may be delivered through a communication network such as Internet, as information or signals indicative of this program.

What is claimed is:
1. An image forming apparatus comprising:
an image forming device configured to perform an image forming operation;

a first communication interface configured to communicate with an information processing terminal connected by peer-to-peer through a communication line;
a second communication interface configured to communicate with the information processing terminal by specifying terminal address information, the terminal address information being address information that identifies the information processing terminal on a communication network;
a notifier;
a controller; and
a memory configured to store apparatus information, the apparatus information being information needed for the information processing terminal to transmit formation instructing information that instructs the image forming operation, the memory further storing instructions, the instructions, when executed by the controller, causing the image forming apparatus to execute:
receiving transmission requesting information from the information processing terminal through the first communication interface;
in response to receiving the transmission requesting information, transmitting the apparatus information stored in the memory to the information processing terminal through the first communication interface;
setting the second communication interface for connection through the communication network;
detecting that a status of the second communication interface has changed from not connected to the communication network to connected to the communication network; and
when a change from not connected to the communication network to connected to the communication network is detected, controlling the notifier to notify that a setting change of the information processing terminal is needed to transmit the formation instructing information through the communication network.

2. The image forming apparatus according to claim 1, wherein the memory further stores instructions, the instructions, when executed by the controller, causing the image forming apparatus to execute:
determining whether the apparatus information is already transmitted to the information processing terminal; and
wherein the memory further stores instructions, the instructions, when executed by the controller, causing the image forming apparatus to:
in response to detecting that the second communication interface is connected to the communication network and to determining that the apparatus information has already been transmitted, execute the controlling of the notifier; and
in response to detecting that the second communication interface is connected to the communication network and to determining that the apparatus information has not yet been transmitted, not execute the controlling of the notifier.

3. The image forming apparatus according to claim 1, wherein the memory further stores instructions, the instructions, when executed by the controller, causing the image forming apparatus to execute:
receiving the terminal address information, through the first communication interface, from the information processing terminal that is transmission destination of the apparatus information;
storing, in the memory, the terminal address information received; and
in response to detecting that the second communication interface is connected to the communication network, transmitting setting notification information, through the second communication interface, to the information processing terminal identified by the terminal address information stored in the memory, the setting notification information including apparatus address information that is the address information identifying the image forming apparatus on the communication network, the setting notification information being information indicating that the setting change of the information processing terminal is needed to transmit the formation instructing information through the communication network.

4. The image forming apparatus according to claim 3, wherein the memory further stores a notification flag configured to take a first value indicating that the setting notification information has been already transmitted to the information processing terminal and a second value indicating that the setting notification information has not yet been transmitted;
wherein the second value is stored as the notification flag together with the terminal address information;
wherein the memory further stores instructions, the instructions, when executed by the controller, causing the image forming apparatus to execute, after transmitting setting notification information, storing the first value as the notification flag; and
wherein the memory further stores instructions, the instructions, when executed by the controller, causing the image forming apparatus to:
execute the controlling of the notifier in response to determining that the memory stores the terminal address information associated with the second value as the notification flag; and
not execute the controlling of the notifier in response to determining that the memory stores no terminal address information associated with the second value as the notification flag.

5. The image forming apparatus according to claim 1, wherein the memory further stores instructions, the instructions, when executed by the controller, causing the image forming apparatus to execute:
receiving apparatus-address requesting information from the information processing terminal through the first communication interface; and
in response to detecting that the second communication interface is connected to the communication network and to receiving the apparatus-address requesting information, transmitting apparatus address information to the information processing terminal through the first communication interface, the apparatus address information being the address information that identifies the image forming apparatus on the communication network.

6. The image forming apparatus according to claim 1, wherein the memory further stores instructions, the instructions, when executed by the controller, causing the image forming apparatus to execute:
receiving the formation instructing information from the information processing terminal through one of the first communication interface and the second communication interface; and
controlling the image forming device to perform the image forming operation in accordance with the formation instructing information received.

7. The image forming apparatus according to claim 1, wherein the first communication interface comprises a USB interface, and the second communication interface comprises a wired or wireless LAN interface.

8. The image forming apparatus according to claim 1, wherein the notifier comprises at least one of a display, a speaker, and a lamp that notifies a user that the setting change of the information processing terminal is needed.

9. The image forming apparatus according to claim 1, wherein the setting change is a change from a first setting to a second setting, the first setting being a setting in which the formation instructing information is transmitted from the information processing terminal to the image forming apparatus through the first communication interface, the second setting being a setting in which the formation instructing information is transmitted from the information processing terminal to the image forming apparatus through the second communication interface.

10. A non-transitory computer-readable storage medium storing a monitor program executable on an information processing terminal including a communication interface configured to communicate with an image forming apparatus connected by peer-to-peer through a communication line, a communication interface configured to communicate with the image forming apparatus by specifying apparatus address information, a notifier, and a memory configured to store an output program, the apparatus address information being address information identifying the image forming apparatus on a communication network, the output program being configured to control the information processing terminal to transmit formation instructing information that instructs an image forming operation, to the image forming apparatus, through one of the communication interfaces,
the monitor program, when executed by the information processing terminal, causes the information processing terminal to
in response to that the output program being set to transmit the formation instructing information through the communication interface configured to communicate with an image forming apparatus connected by peer-to-peer through a communication line, prepare such a state that information is received from the image forming apparatus through the communication interface configured to communicate with the image forming apparatus by specifying apparatus address information;
receive setting notification information from the image forming apparatus through the communication interface configured to communicate with the image forming apparatus by specifying apparatus address information, the setting notification information including the apparatus address information, the setting notification information being information indicating that a setting change of the output program is needed to transmit the formation instructing information through the communication network; and
control the notifier to notify that the setting change of the output program is needed, in accordance with the setting notification information received, at a timing when a communication interface of the image forming apparatus is connected to the communication network.

11. The non-transitory computer-readable storage medium according to claim 10, wherein the information processing terminal includes an operating interface;
wherein the monitor program when executed by the information processing terminal, causes the information processing terminal to:
receive, through the operating interface, an instruction operation of instructing the setting change of the output program; and
in response to receiving the instruction operation set the output program such that the formation instructing information is transmitted through the communication interface configured to communicate with the image forming apparatus by specifying apparatus address information by using the apparatus address information received.

12. The non-transitory computer-readable storage medium according to claim 10, wherein the preparing such the state comprises opening a particular port of the communication interface configured to communicate with the image forming apparatus by specifying apparatus address information so as to enable the information processing terminal to receive information transmitted to the particular port.

13. The non-transitory computer-readable storage medium according to claim 10, wherein the notifier comprises a display;
wherein the notification comprises a setting notification screen is displayed on the display in accordance with the setting notification information, the setting notification screen being a screen for notifying that the setting change of the output program is needed to transmit the formation instructing information through the communication network; and
wherein the setting notification screen includes a first icon corresponding to an instruction of performing the setting change of the output program, and a second icon corresponding to an instruction of cancelling the setting change of the output program.

14. The non-transitory computer-readable storage medium according to claim 10, wherein the notifier comprises at least one of a display, a speaker, and a lamp that notifies a user that the setting change of the output program is needed.

15. The non-transitory computer-readable storage medium according to claim 10, wherein the setting change is a change from a first setting to a second setting, the first setting being a setting in which the formation instructing information is transmitted from the information processing terminal to the image forming apparatus through the communication interface configured to communicate with an image forming apparatus connected by peer-to-peer through a communication line, the second setting being a setting in which the formation instructing information is transmitted from the information processing terminal to the image forming apparatus through the communication interface configured to communicate with the image forming apparatus by specifying apparatus address information.

16. An image forming system comprising an image forming apparatus and an information processing terminal,
the image forming apparatus comprising:
an image forming device configured to perform an image forming operation;
a first communication interface configured to communicate with the information processing terminal connected by peer-to-peer through a communication line;
a second communication interface configured to communicate with the information processing terminal by specifying terminal address information, the terminal address information being address information that identifies the information processing terminal on a communication network;
a notifier;
a controller; and
a memory configured to store apparatus information, the apparatus information being information needed for the information processing terminal to transmit formation instructing information that instructs the image forming operation, the memory further storing instructions, the instructions, when executed by the controller, causing the image forming apparatus to execute:
receiving transmission requesting information from the information processing terminal through the first communication interface;
in response to receiving the transmission requesting information, transmitting the apparatus information stored in the memory to the information processing terminal through the first communication interface;
setting the second communication interface for connection through the communication network;
detecting that a status of the second communication interface has changed from not connected to the communication network to connected to the communication network; and
when a change from not connected to the communication network to connected to the communication network is detected, controlling the notifier to notify that a setting change of the information processing terminal is needed to transmit the formation instructing information through the communication network,
the information processing terminal comprising:
a third communication interface configured to communicate with the image forming apparatus connected by peer-to-peer through the communication line;
a fourth communication interface configured to communicate with the image forming apparatus by specifying apparatus address information, the apparatus address information being the address information identifying the image forming apparatus on the communication network;
a terminal notifier;
a terminal controller; and
a terminal memory configured to store an output program, the output program being configured to transmit the formation instructing information to the image forming apparatus through one of the third communication interface and the fourth communication interface, the terminal memory further storing instructions, the instructions, when executed by the terminal controller, causing the information processing terminal to execute:
transmitting the transmission requesting information to the image forming apparatus through the third communication interface;
receiving the apparatus information from the image forming apparatus through the third communication interface; and
setting the output program such that the formation instructing information is transmitted through the fourth communication interface by using the apparatus information received.

17. The image forming system according to claim 16, wherein the terminal memory further storing instructions, the instructions, when executed by the terminal controller, causing the information processing terminal to:
transmit setting confirmation information to the image forming apparatus through the third communication interface, the setting confirmation information being information for requesting the image forming apparatus to transmit setting information indicative of whether the image forming apparatus is connected to the communication network;
receive the setting information from the image forming apparatus through the third communication interface;
determine whether the image forming apparatus is connected to the communication network based on the setting information;
in response to determining that the image forming apparatus is connected to the communication network, transmit terminal-list requesting information to the image forming apparatus through the third communication interface, the terminal-list requesting information being information for requesting transmission of a terminal list stored in the image forming apparatus;
receive the terminal list from the image forming apparatus through the third communication interface;
determine whether the terminal list includes a terminal record including terminal address information of the information processing terminal itself;
in response to determining that the terminal list includes a terminal record including the terminal address information of the information processing terminal itself, transmit apparatus-address requesting information to the image forming apparatus through the third communication interface, the apparatus-address requesting information being information for requesting transmission of the apparatus address information set to the second communication interface of the image forming apparatus;
receive the apparatus address information from the image forming apparatus through the third communication interface;
in response to receiving the apparatus address information, controlling the terminal notifier to notify that the setting change of the output program is needed;
execute the setting; and
transmit terminal-record deletion requesting information to the image forming apparatus through the fourth communication interface, the terminal-record deletion requesting information being information for requesting deletion of the terminal record of the information processing terminal itself from the terminal list, so that the controlling of the terminal notifier is not executed.

18. The image forming system according to claim 16, wherein the notifier comprises at least one of a display, a speaker, and a lamp that notifies a user that the setting change of the information processing terminal is needed.

19. The image forming system according to claim 16, wherein the setting change is a change from a first setting to a second setting, the first setting being a setting in which the formation instructing information is transmitted from the information processing terminal to the image forming apparatus through the first communication interface and the third communication interface, the second setting being a setting in which the formation instructing information is transmitted from the information processing terminal to the image forming apparatus through the second communication interface and the fourth communication interface.

* * * * *